US012573324B2

(12) United States Patent
Matsui

(10) Patent No.: US 12,573,324 B2
(45) Date of Patent: Mar. 10, 2026

(54) IMAGE DISPLAY DEVICE AND ABNORMALITY MONITORING SYSTEM FOR IMAGE DISPLAY DEVICE

(71) Applicant: SHARP KABUSHIKI KAISHA, Sakai City (JP)

(72) Inventor: Kuniaki Matsui, Sakai City (JP)

(73) Assignee: SHARP KABUSHIKI KAISHA, Sakai City (JP)

( * ) Notice: Subject to any disclaimer, the term of this patent is extended or adjusted under 35 U.S.C. 154(b) by 0 days.

(21) Appl. No.: 18/808,331

(22) Filed: Aug. 19, 2024

(65) Prior Publication Data

US 2025/0078704 A1 Mar. 6, 2025

(30) Foreign Application Priority Data

Aug. 30, 2023 (JP) ................................ 2023-139697

(51) Int. Cl.
*G09G 3/00* (2006.01)
*G09G 3/32* (2016.01)

(52) U.S. Cl.
CPC ............... *G09G 3/006* (2013.01); *G09G 3/32* (2013.01); *G09G 2300/026* (2013.01)

(58) Field of Classification Search
CPC ..... G09G 3/006; G09G 3/32; G09G 2300/026
See application file for complete search history.

(56) References Cited

U.S. PATENT DOCUMENTS

| | | | | |
|---|---|---|---|---|
| 2010/0171733 A1* | 7/2010 | Kobayashi | ........... | G09G 3/3208 345/211 |
| 2013/0198537 A1* | 8/2013 | Uehara | ..................... | G06F 1/30 713/300 |
| 2014/0232360 A1* | 8/2014 | Dally | .................. | H02M 3/1588 323/266 |
| 2020/0055597 A1* | 2/2020 | Fujimoto | ................. | B64D 1/08 |
| 2020/0306912 A1* | 10/2020 | Nishi | .................... | G01M 13/00 |

FOREIGN PATENT DOCUMENTS

| | | |
|---|---|---|
| JP | 2001-125540 A | 5/2001 |

* cited by examiner

*Primary Examiner* — Kwang-Su Yang
(74) *Attorney, Agent, or Firm* — ScienBiziP, P.C.

(57) ABSTRACT

An image display device includes multiple display panels, a power supply unit, an image data input unit, a predicted current amount calculator, an actual current amount measurement unit, a current comparison unit, and an abnormality determiner. Each display panel includes multiple light-emitting elements. The power supply unit supplies power to each display panel for displaying an image. The image data input unit inputs image data to each display panel for displaying an image. The predicted current amount calculator calculates a predicted current amount in each display panel based on image data input to each display panel. The actual current amount measurement unit measures an actual current amount in each display panel. The current comparison unit compares the predicted current amount with the actual current amount in each display panel. The abnormality determiner determines whether there is an abnormality in each display panel based on a result of comparison.

5 Claims, 6 Drawing Sheets

IMAGE DISPLAY DEVICE AND ABNORMALITY MONITORING SYSTEM FOR IMAGE DISPLAY DEVICE

INCORPORATION BY REFERENCE

This application claims priority under Section 119 of U.S.C. to Japanese Patent Application No. 2023-139697 filed on Aug. 30, 2023, the entire content of which is incorporated herein by reference.

BACKGROUND

The disclosure relates to an image display device and an abnormality monitoring system for the image display device.

An image display device includes a circuit configuration for determining whether there is an abnormality.

SUMMARY

According to one aspect of the disclosure, an image display device includes multiple display panels, a power supply unit, an image data input unit, a predicted current amount calculator, an actual current amount measurement unit, a current comparison unit, and an abnormality determiner. The multiple display panels each include multiple light-emitting elements. The power supply unit supplies power to each of the multiple display panels for displaying an image. The image data input unit inputs image data to each of the multiple display panels for displaying an image. The predicted current amount calculator calculates a predicted current amount in each of the multiple display panels based on image data input to each of the multiple display panels. The actual current amount measurement unit measures an actual current amount for each of the multiple display panels. The current comparison unit compares the predicted current amount with the actual current amount in each of the multiple display panels. The abnormality determiner determines whether there is an abnormality in each of the multiple display panels based on a result of comparison.

DETAILED DESCRIPTION

Figure 1:
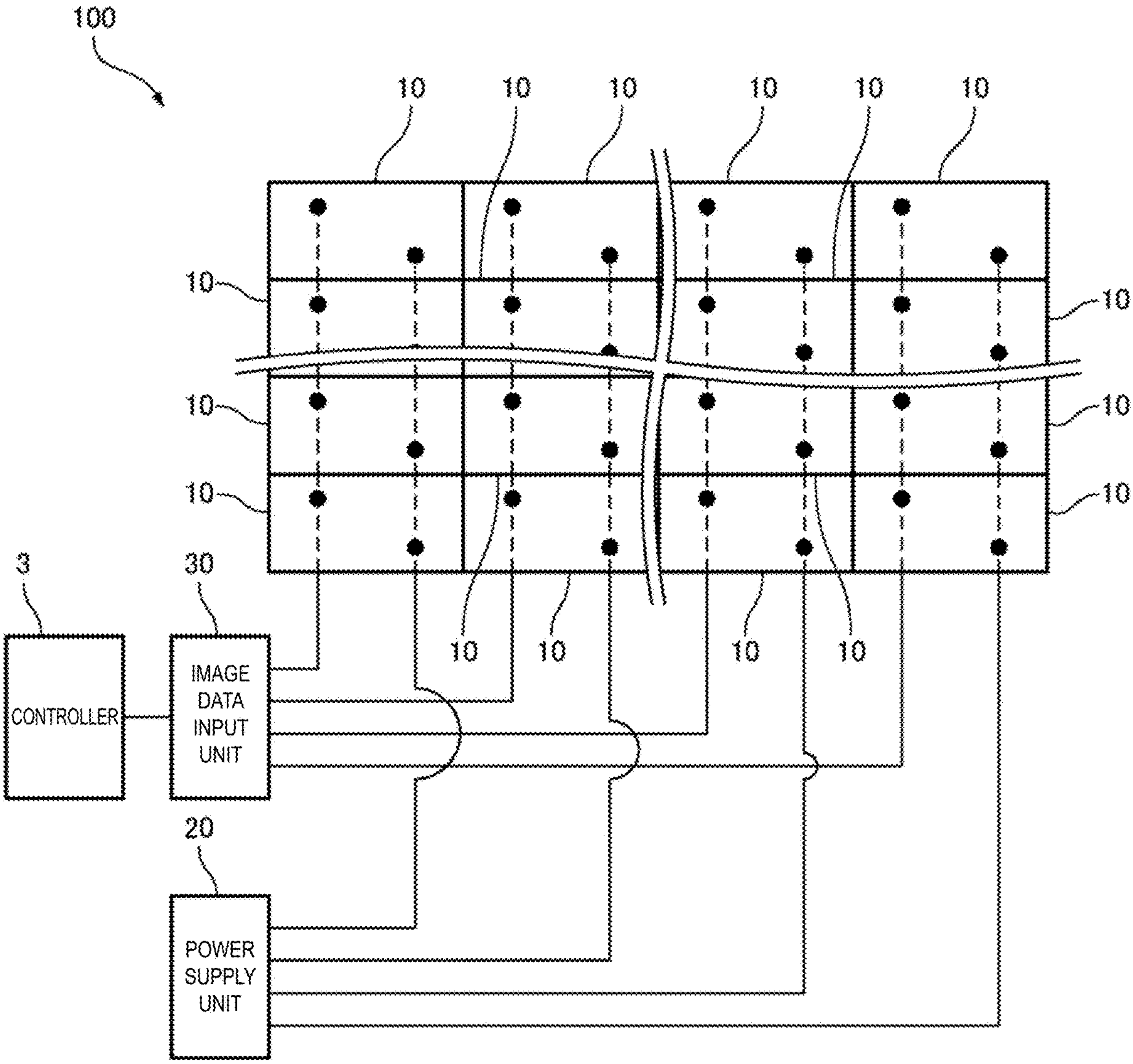
FIG. 1 is a schematic diagram of an image display device according to a first embodiment.

Embodiments of the disclosure will be described below with reference to the drawings. In the drawings, the same or equivalent components are denoted by the same reference numerals and signs, and description thereof will not be repeated. Further, in the following description, even when terms such as "vertical" or "horizontal" may be used to indicate a specific position and direction, these terms are used for convenience in order to facilitate understanding of the contents of the embodiments, and have no relation to the direction in which the embodiments are actually implemented.

First Embodiment

An image display device 100 according to a first embodiment will be described below with reference to FIG. 1 to FIG. 5.

First, an outline of the image display device 100 will be described with reference to FIG. 1. FIG. 1 is a schematic diagram of the image display device 100 according to the first embodiment. Note that the image display device 100 is also referred to as a video wall or a light-emitting element display device.

As illustrated in FIG. 1, the image display device 100 includes, for example, multiple modules 10. Each module 10 is supplied with power from a power supply unit 20. Each module 10 receives image data from an image data input unit 30 under control of a controller 3.

Figure 2:
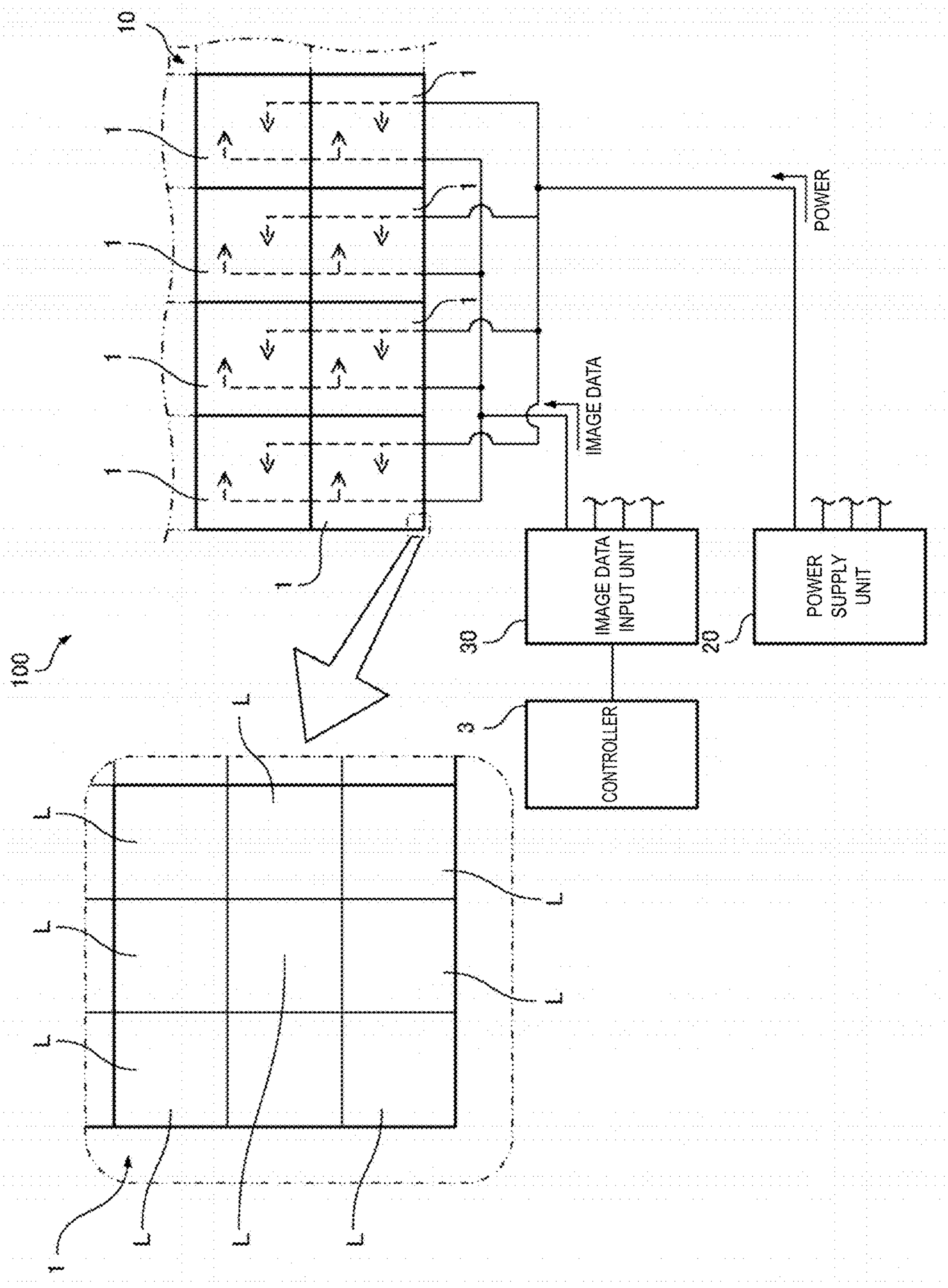
FIG. 2 is a schematic diagram of the image display device focusing on one module.
Figure 3:
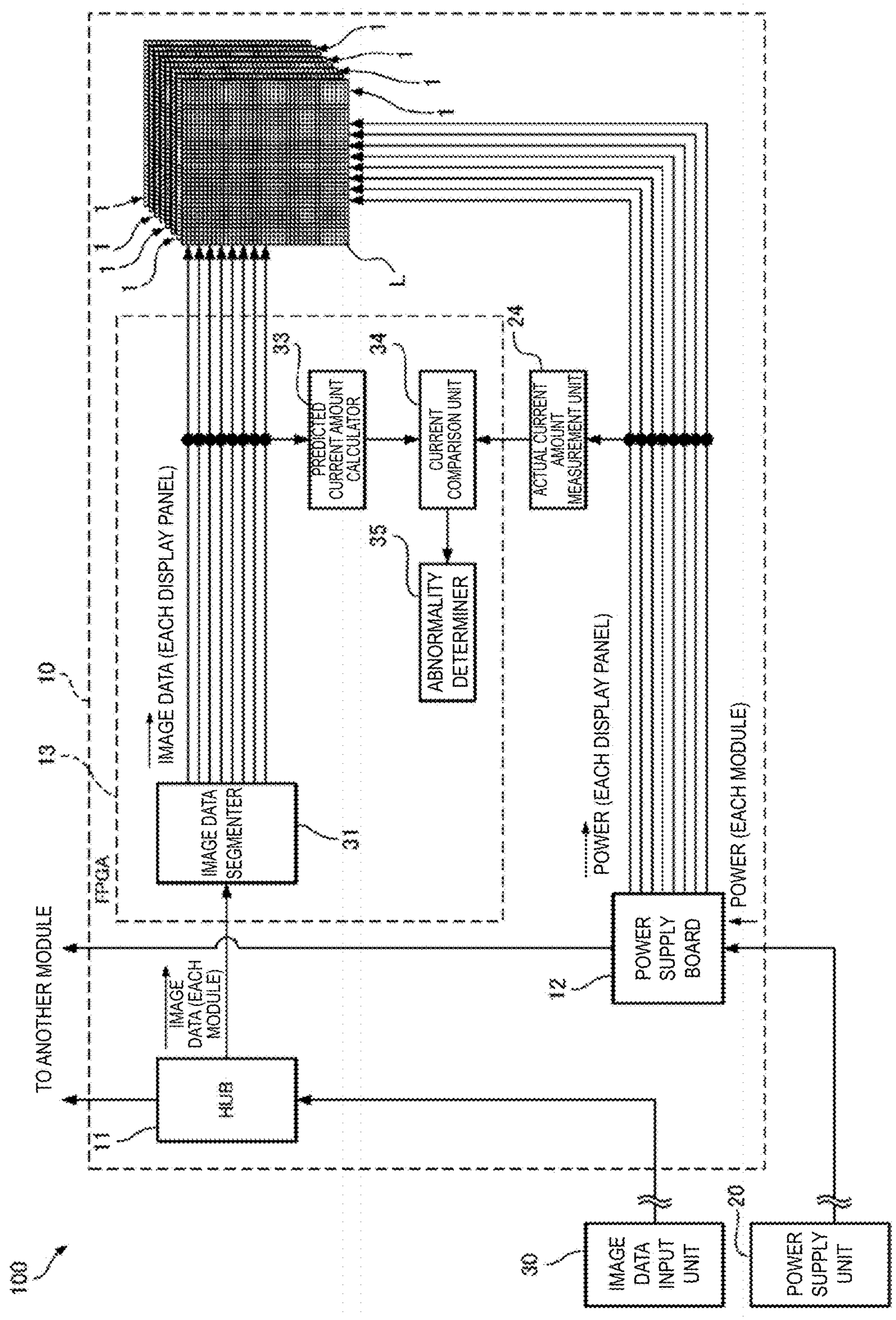
FIG. 3 is a block diagram of the image display device focusing on one module.

The image display device 100 will be described in detail below with reference to FIG. 2 and FIG. 3, focusing on one module 10. FIG. 2 is a schematic diagram of the image display device 100 focusing on one module 10. FIG. 3 is a block diagram of the image display device 100 focusing on one module 10.

As illustrated in FIG. 2, the image display device 100 includes multiple display panels 1, and the power supply unit 20 and the image data input unit 30 described above. One module 10 includes multiple display panels 1.

Each of the multiple display panels 1 includes multiple light-emitting elements L. The power supply unit 20 supplies power to each of the multiple display panels 1 for displaying an image. The image data input unit 30 inputs image data to each of the multiple display panels 1 for displaying an image.

As illustrated in FIG. 3, the image display device 100 further includes a predicted current amount calculator 33, an actual current amount measurement unit 24, a current comparison unit 34, and an abnormality determiner 35.

The predicted current amount calculator 33 calculates a predicted current amount in each of the multiple display panels 1 based on image data input to each of the multiple display panels 1. The actual current amount measurement unit 24 measures an actual current amount for each of the multiple display panels 1.

The current comparison unit 34 compares the predicted current amount with the actual current amount in each of the multiple display panels 1. The abnormality determiner 35 determines whether there is an abnormality in each of the multiple display panels 1 based on a result of comparison.

Thus, while each of the multiple display panels 1 displays an image, the predicted current amount is compared with the actual current amount to determine whether there is an abnormality in each of the multiple display panels 1. As a result, the image display device 100 can quickly detect an abnormality that is difficult to find visually.

Each module 10 will be described in detail below with reference to FIG. 3.

As illustrated in FIG. 3, each module 10 includes, for example, eight display panels 1. The eight display panels 1 are illustrated in a stacked state in FIG. 3 for convenience, but are actually arranged in a matrix of two vertically and four horizontally. The display panel 1 is also referred to as a pixel card. The display panel 1 is a collective circuit of light-emitting elements L. The light-emitting element L is preferably a light-emitting diode (LED) element.

Each module 10 further includes a HUB 11, a field programmable gate array (FPGA) 13, and a power supply board 12.

The HUB 11 receives image data (video signals) to be displayed on all the modules 10 from the image data input unit 30 directly or via an adjacent module 10. The HUB 11 branches image data (video signals) to be displayed on each module 10 from the image data (video signals) to be displayed on all the modules 10. The HUB 11 transmits the image data to be displayed on each module 10 to the FPGA 13 using low voltage differential signaling (LVDS). On the other hand, the HUB 11 transmits the image data (video signals) to be displayed on all the modules 10 to another module 10.

The FPGA 13 is a device in which logic circuits (gates) are integrated. The FPGA 13 also includes memory elements. The memory elements are logic circuits, such as flip-flops, that temporarily store required data.

The FPGA 13 includes an image data segmenter 31, and the predicted current amount calculator 33, the current comparison unit 34, and the abnormality determiner 35 described above. The FPGA 13, including the predicted current amount calculator 33, the current comparison unit 34, and the abnormality determiner 35, has the following two advantages. A first advantage is that it is not necessary to provide separate devices for the predicted current amount calculator 33, the current comparison unit 34, and the abnormality determiner 35. A second advantage is that determination of whether there is an abnormality is even faster.

The image data segmenter 31 receives image data to be displayed on each module 10 from the HUB 11. The image data segmenter 31 segments image data to be displayed on each display panel 1 from the image data to be displayed on each module 10. The image data segmenter 31 transmits image data to be displayed on each display panel 1 to each display panel 1 via a serial peripheral interface (SPI) bus.

The power supply board 12 receives power from the power supply unit 20 directly or via an adjacent module 10. The power supply board 12 includes power supply relays (not illustrated). The power supply board 12 distributes the supplied power to the respective display panels 1 via the power supply relays. On the other hand, the power supply board 12 also supplies the received power to another module 10.

Figure 4:
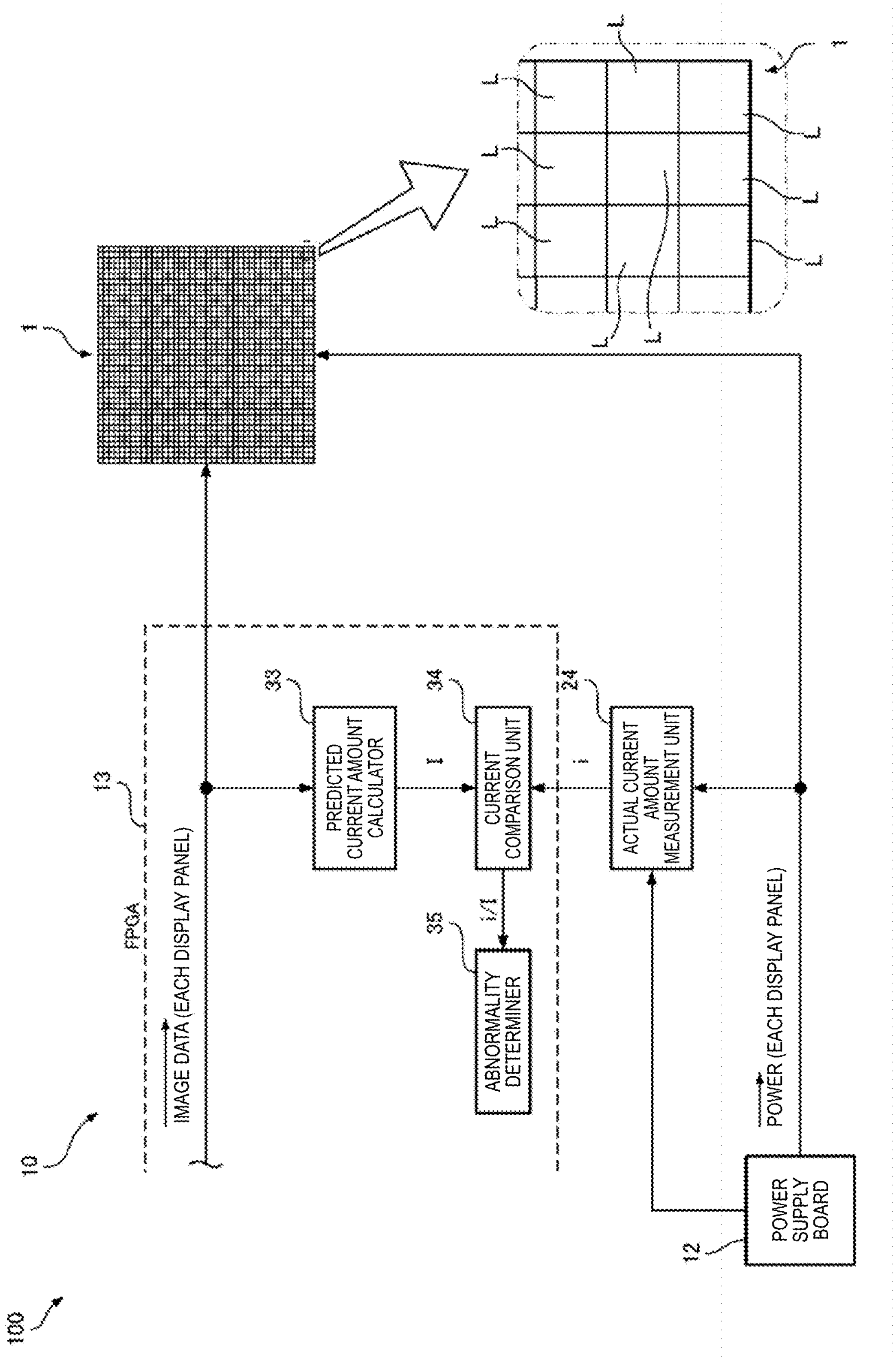
FIG. 4 is an enlarged block diagram of an FPGA and one display panel in FIG. 3.

With reference to FIG. 4, a configuration for determining whether there is an abnormality will be described in detail below while focusing on one display panel 1. FIG. 4 is an enlarged block diagram illustrating the FPGA 13 and one display panel 1 in FIG. 3.

First, image data input to one display panel 1 will be described.

The image data input to one display panel 1 includes information for each of light-emitting elements L constituting one display panel 1. Each light-emitting element L is a pixel and therefore displays one color. One color displayed by each light-emitting element L is a combination of multiple primary colors. A grayscale value for each of the multiple primary colors to be combined is set according to a color to be displayed by the light-emitting element L. Therefore, the information for each light-emitting element L in the image data is the set grayscale value and the maximum possible grayscale value for each of the multiple primary colors.

Here, a specific example focusing on one light-emitting element L will be described. The primary colors to be combined are red (R), green (G), and blue (B). For each of the multiple (three) primary colors, the maximum possible grayscale value is 256. Therefore, for each of the multiple primary colors, the set grayscale value is one grayscale value of 0 to 256. For example, as shown in Table 1, the set grayscale value is a grayscale value of 64 for red (R), a grayscale value of 128 for green (G), and a grayscale value of 32 for blue (B).

TABLE 1

| Combined primary colors | Maximum current amount for each primary color | Maximum possible grayscale value | Set grayscale value | Individual predicted current amount for each primary color |
|---|---|---|---|---|
| Red (R) | 20 mA | 256 | 64 | 20 × 64/256 = 5 mA |
| Green (G) | 20 mA | 256 | 128 | 20 × 128/256 = 10 mA |
| Blue (B) | 20 mA | 256 | 32 | 20 × 32/256 = 2.5 mA |

In the predicted current amount calculator 33, the maximum current amount value for each primary color is input in advance. The predicted current amount calculator 33 calculates a predicted current amount in each light-emitting element L (hereinafter, individual predicted current amount) for each primary color. To be specific, the predicted current amount calculator 33 multiplies, for each primary color, a value of the maximum current amount by a value obtained by dividing the set grayscale value by the maximum possible grayscale value. Thus, the predicted current amount calculator 33 calculates the individual predicted current amount for each primary color. Then, the predicted current amount calculator 33 calculates an individual predicted current amount in one target light-emitting element L from the sum of the individual predicted current amounts for the respective primary colors.

In the example shown in Table 1, for red (R), the predicted current amount calculator 33 multiplies 20 mA, which is the value of the maximum current amount, by a value obtained by dividing 64, which is the set grayscale value, by 256, which is the possible maximum grayscale value. Accordingly, for red (R), the individual predicted current amount is 20 mA×64/256 (i.e., 5 mA). Similarly, for green (G), the predicted current amount calculator 33 multiplies 20 mA, which is the value of the maximum current amount, by a value obtained by dividing 128, which is the set grayscale value, by 256, which is the maximum possible grayscale value. Accordingly, for green (G), the individual predicted current amount is 20 mA×128/256 (i.e., 10 mA). Similarly, for blue (B), the predicted current amount calculator 33 multiplies 20 mA, which is the value of the maximum current amount, by a value obtained by dividing 32, which is the set grayscale value, by 256, which is the maximum possible grayscale value. Accordingly, for blue (B), the individual predicted current amount is 20 mA×32/256 (i.e., 2.5 mA). Then, the predicted current amount calculator 33 calculates 5 mA+10 mA+2.5 mA (i.e., 17.5 mA) as the sum of the individual predicted current amounts for the respective primary colors. The individual predicted current amount in one target light-emitting element L in Table 1 is 17.5 mA.

The predicted current amount calculator 33 calculates, for each light-emitting element L, the individual predicted current amounts of all the light-emitting elements L included in one target display panel 1. Then, the predicted current amount calculator 33 calculates the predicted current amount in one target display panel 1 from the sum of the individual predicted current amounts for the respective light-emitting elements L.

The actual current amount measurement unit 24 is an ammeter. Although details of the actual current amount measurement unit 24 are omitted in FIG. 3, the actual current amount measurement unit 24 is provided for each display panel 1 and is supplied power from the power supply board 12.

The actual current amount measurement unit 24 includes a shunt resistor and a voltage measurement unit, both of which are not illustrated. The shunt resistors are provided in series on paths through which power is supplied from the power supply board 12 to the respective display panels 1. The voltage measurement unit measures a voltage difference between both ends of the shunt resistor. The actual current amount is measured from a resistance value of the shunt resistor and the voltage difference measured by the voltage measurement unit. The actual current amount is converted into digital data by an analog-to-digital converter (ADC) (not illustrated), and is input to the current comparison unit 34.

As a comparison between the predicted current amount and the actual current amount, the current comparison unit 34 divides the actual current amount by the predicted current amount. The current comparison unit 34 transmits a value obtained by dividing the actual current amount by the predicted current amount, that is, a ratio of the actual current amount to the predicted current amount, to the abnormality determiner 35.

The abnormality determiner 35 determines that there is an abnormality in the display panel 1 when the ratio of the actual current amount to the predicted current amount exceeds a first threshold value.

Therefore, when the actual current amount is large enough to correspond to a malfunction, that is, when the display panel 1 is bright enough to correspond to a malfunction, it is determined that there is an abnormality. The image display device 100 can quickly detect an abnormality in which the display panel 1 is bright enough to correspond to a malfunction.

The abnormality determiner 35 determines that there is an abnormality in the display panel 1 when the ratio of the actual current amount to the predicted current amount is smaller than a second threshold value.

Therefore, when the actual current amount is small enough to correspond to a malfunction, that is, when the display panel 1 is dark enough to correspond to a malfunction, it is determined that there is an abnormality. The image display device 100 can quickly detect an abnormality in which the display panel 1 is dark enough to correspond to a malfunction.

The first threshold value is, for example, preferably in a range of 120% to 140%, and more preferably 130%. The second threshold value is preferably, for example, in a range of 60% to 80%, and more preferably 70%.

The abnormality determiner 35 may be configured to set both the first threshold value and the second threshold value, or may be configured to set one of the first threshold value and the second threshold value.

Figure 5:
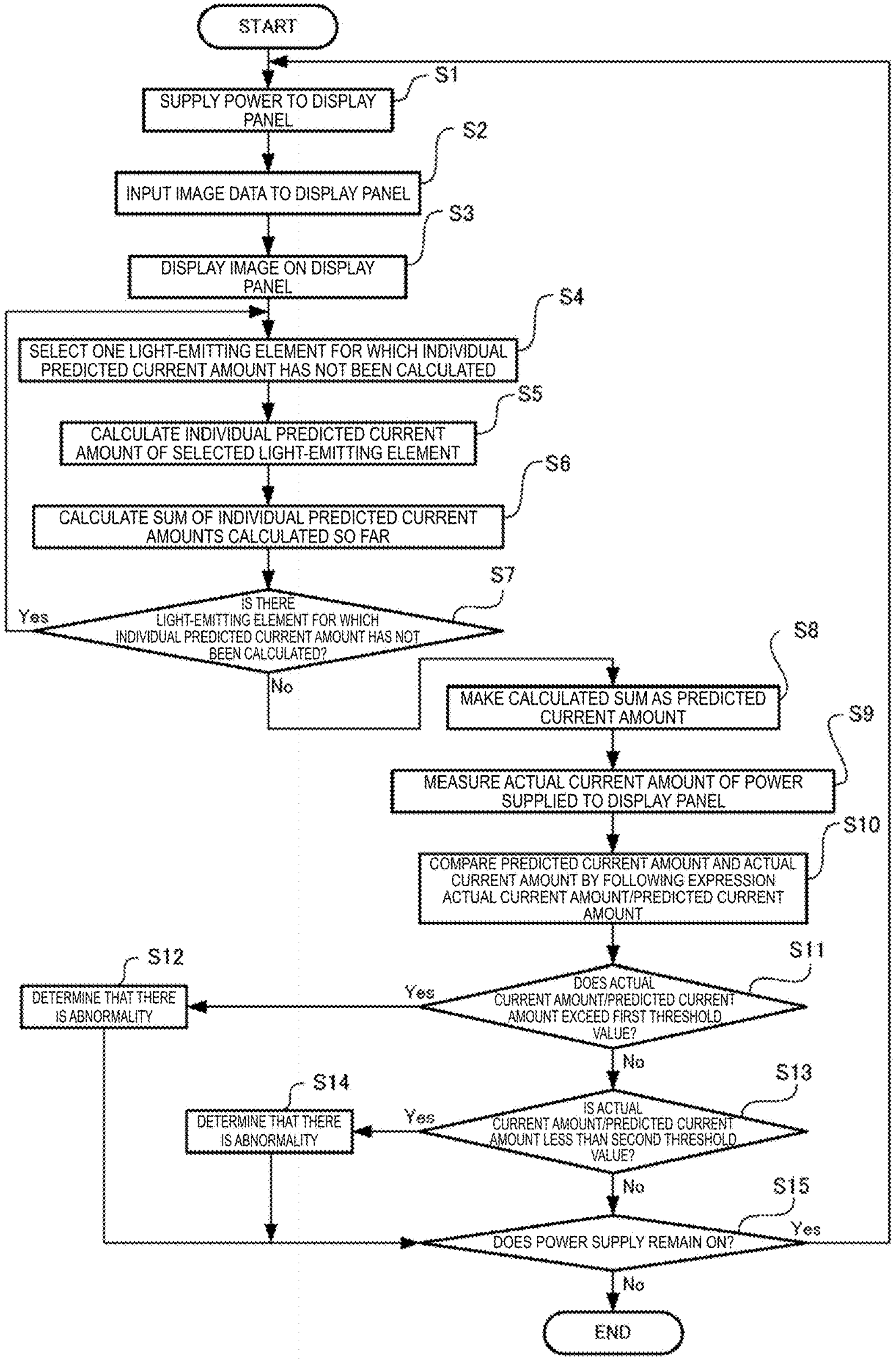
FIG. 5 is a flowchart illustrating operations of the image display device.

Operations of the image display device 100 will be described below with reference to FIG. 5. FIG. 5 is a flowchart illustrating operations of the image display device 100.

As illustrated in FIG. 5, in step S1, the power supply board 12 supplies power to the display panel 1. In step S2, the FPGA 13 inputs image data to the display panel 1. In step S3, the display panel 1 displays an image based on the input image data. Each of the multiple light-emitting elements L constituting the display panel 1 displays a color as a pixel.

In step S4, the predicted current amount calculator 33 selects one light-emitting element L for which an individual predicted current amount has not been calculated. In step S5, the predicted current amount calculator 33 calculates the individual predicted current amount of the selected light-emitting element L. In step S6, the predicted current amount calculator 33 calculates the sum of the individual predicted current amounts calculated so far for one target display panel 1.

In step S7, the predicted current amount calculator 33 determines whether there is any light-emitting element L for which an individual predicted current amount has not been calculated. If there is a light-emitting element L for which the individual predicted current amount has not been calculated (Yes in step S7), the process returns to step S4. If there is no light-emitting element L for which the individual predicted current amount has not been calculated (No in step S7), the process proceeds to step S8. In step S8, the predicted current amount calculator 33 makes the sum of the individual predicted current amounts as the predicted current amount.

In step S9, the actual current amount measurement unit 24 measures an actual current amount of power supplied to the one target display panel 1.

In step S10, the current comparison unit 34 compares the predicted current amount with the actual current amount by dividing the actual current amount by the predicted current amount.

In step S11, the abnormality determiner 35 determines whether the ratio of the actual current amount to the predicted current amount exceeds the first threshold value. If the ratio of the actual current amount to the predicted current amount exceeds the first threshold value (Yes in step S11), the process proceeds to step S12. If the ratio of the actual current amount to the predicted current amount does not exceed the first threshold value (No in step S11), the process proceeds to step S13.

In step S12, the abnormality determiner 35 determines that there is an abnormality in the target display panel 1 because it is bright enough to correspond to a malfunction. After step S12, the process proceeds to step S15.

In step S13, the abnormality determiner 35 determines whether the ratio of the actual current amount to the predicted current amount is less than the second threshold value. If the ratio of the actual current amount to the predicted current amount is less than the second threshold value (Yes in step S13), the process proceeds to step S14. If the ratio of the actual current amount to the predicted current amount is not less than the second threshold value (No in step S13), the process proceeds to step S15.

In step S14, the abnormality determiner 35 determines that there is an abnormality in the target display panel 1 because it is dark enough to correspond to a malfunction. After step S14, the process proceeds to step S15.

In step S15, if the power remains ON (Yes in step S15), the process returns to step S1, and if the power is OFF (No in step S15), the process ends.

Second Embodiment

Figure 6:
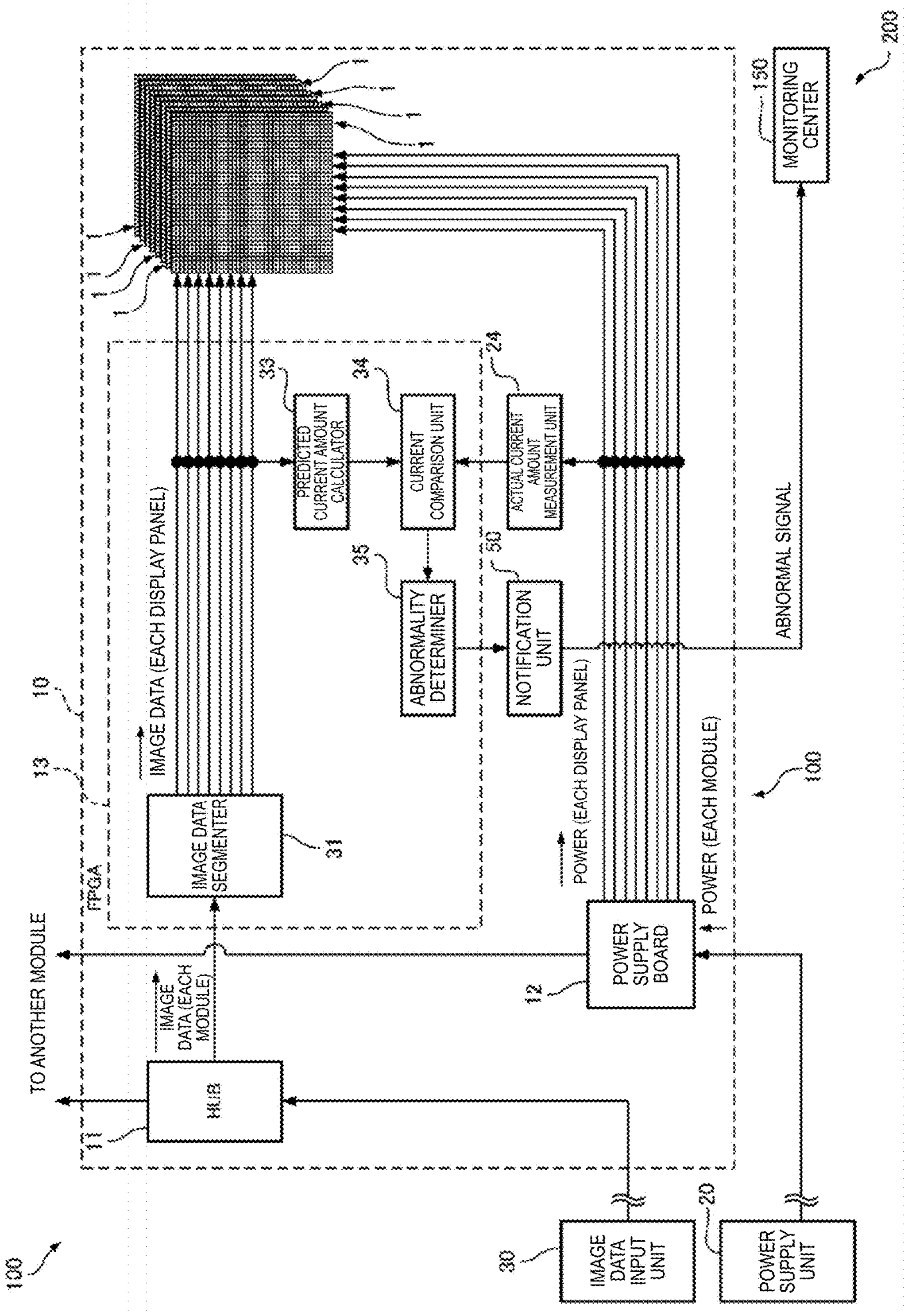
FIG. 6 is a block diagram of an image display device according to a second embodiment and an abnormality monitoring system therefor.

Next, an image display device 100 according to a second embodiment will be described with reference to FIG. 6. The image display device 100 according to the second embodiment is different from that in the first embodiment in that a notification unit 50 is included. Differences between the second embodiment and the first embodiment will be described below. FIG. 6 is a block diagram of the image display device 100 according to the second embodiment and an abnormality monitoring system 200 therefor.

As illustrated in FIG. 6, the image display device 100 further includes a notification unit 50. The notification unit 50 notifies an external device when the abnormality determiner 35 determines that there is an abnormality.

Therefore, when it is determined that there is an abnormality, a notification is sent to the external device, so that the image display device 100 can extremely quickly detect the abnormality that is difficult to find visually.

The notification by the notification unit 50 is, for example, an alert or e-mail transmission. For example, the notification unit 50 issues a notification by transmitting an abnormality signal to the external device or the like.

Next, the abnormality monitoring system 200 for the image display device 100 will be described with reference to FIG. 6. The following describes additional features in the abnormality monitoring system 200 compared to the second embodiment.

As illustrated in FIG. 6, the abnormality monitoring system 200 for the image display device 100 includes the image display device 100 and a monitoring center 150. The monitoring center 150 monitors the image display device 100. When the abnormality determiner 35 determines that there is an abnormality, the notification unit 50 notifies the monitoring center 150.

Therefore, when it is determined that there is an abnormality, a notification is sent to the monitoring center 150, so that the abnormality monitoring system 200 for the image display device 100 can exceedingly quickly detect the abnormality that is difficult to find visually.

The embodiments of the disclosure have been described above with reference to the drawings. However, the disclosure is not limited to the above-described embodiments, and can be implemented in various forms without departing from the gist of the disclosure. In addition, various disclosures can be formed by appropriately combining the multiple constituent elements disclosed in the above-described embodiments. For example, some of the constituent elements illustrated in the embodiments may be omitted. In order to facilitate understanding, the drawings are illustrated schematically, focusing on the respective constituent elements, and thicknesses, lengths, numbers, distances, and the like of the illustrated constituent elements are different from actual ones for convenience of creating drawings. In addition, the shapes and other features of the respective constituent elements illustrated in the above-described embodiments are merely examples and are not limited, and various changes can be made without substantially departing from the configuration of the disclosure.

(1) In the first embodiment, the image display device 100 is described as including the multiple modules 10. The image display device 100 may include a single module 10.

(2) In FIG. 2, the module 10 is illustrated as including the display panels arranged in matrix of two vertically and four horizontally (eight in total). The module 10 may include any other number of the display panels 1 as long as the number is more than one.

(3) One display panel 1 may include any number of the light-emitting elements L as long as the number is more than one. For example, the number of the light-emitting elements L included in one display panel 1 is 160 vertically and 160 horizontally, 64 vertically and 64 horizontally, or the like.

(4) In the first embodiment, the maximum possible grayscale value is 256 (8 bits). The maximum possible grayscale value may be another grayscale value, such as a grayscale value of 65536 (16 bits).

(5) In the first embodiment, the multiple primary colors to be combined are three colors of red (R), green (G), and blue (B). The multiple primary colors to be combined may be other primary colors or may be four or more colors.

The invention claimed is:

1. An image display device comprising:
a plurality of display panels, each including a plurality of light-emitting elements;
a power supply circuitry that supplies power to each of the plurality of display panels for displaying an image;
an image data input circuitry that inputs image data to each of the plurality of display panels for displaying the image;
a field programmable gate array; and
an ammeter that measures an actual current amount for each of the plurality of display panels, wherein
the field programmable gate array comprises:
an image data cutout circuitry that cuts out each of cutout image data, that is to be displayed on each of the plurality of display panels, from the image data and that transmits each of the cutout image data to each of the plurality of display panels,
a predicted current amount calculation circuitry that calculates a predicted current amount in each of the plurality of display panels based on the cutout image data input to each of the plurality of display panels,
a current comparison circuitry that compares the predicted current amount with the actual current amount in each of the plurality of display panels, and
an abnormality determination circuitry that determines whether an abnormality exists in each of the plurality of display panels based on a result of the comparison.

2. The image display device according to claim 1, wherein
the abnormality determination circuitry determines that the abnormality exists in any of the plurality of display panels in a case that a ratio of the actual current amount to the predicted current amount exceeds a first threshold value.

3. The image display device according to claim 1, wherein
the abnormality determination circuitry determines that the abnormality exists in any of the plurality of display panels in a case that a ratio of the actual current amount to the predicted current amount is smaller than a second threshold value.

4. The image display device according to claim 1, further comprising:
a notification circuitry that notifies an external device in a case that the abnormality determination circuitry determines that an abnormality exists.

5. An abnormality monitoring system comprising:
the image display device according to claim 4; and
a monitoring center that monitors the image display device, wherein
the notification circuitry notifies the monitoring center in a case that the abnormality determination circuitry determines that an abnormality exists.

* * * * *